July 22, 1952 H. W. TREVASKIS 2,604,076
MULTISTROKE FLUID OPERATED POWER ACTUATOR
Filed Aug. 26, 1947
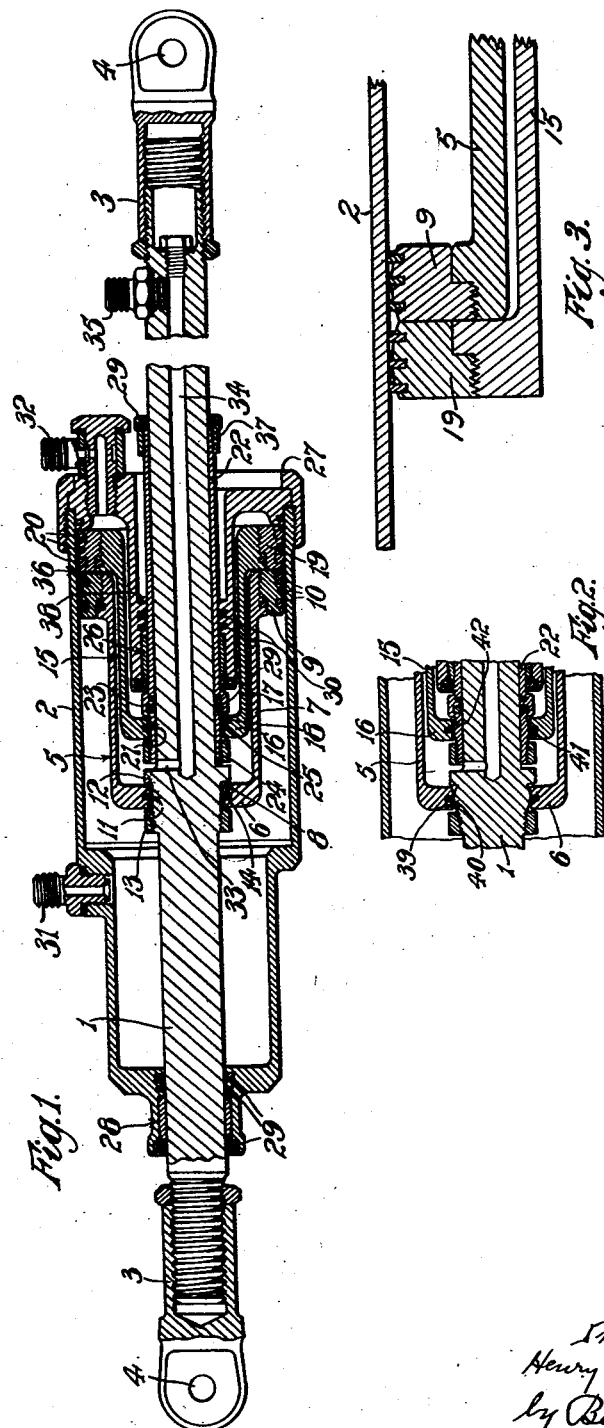
Inventor
Henry William Trevaskis
by Benj. T. Rauber
his attorney Patented July 22, 1952

2,604,076

UNITED STATES PATENT OFFICE 2,604,076

MULTISTROKE FLUID OPERATED POWER ACTUATOR

Henry William Trevaskis, Solihull, Birmingham, England, assignor to Dunlop Rubber Company Limited, London, England, a British corporation Application August 26, 1947, Serial No. 770,655
In Great Britain September 17, 1946

8 Claims. (Cl. 121—38)

My invention relates to a fluid operated jack of the type having a straight through piston rod i. e. a piston rod projecting from each extremity of the cylinder.

Such a rod is provided with, for example, an aperture at each end for securing the rod ends to two members such as flaps on an aircraft and said rod acts as a coupling member to effect simultaneous movement of the members.

It is an object of the invention to provide a means of connection between the piston and piston rod of a jack of this type whereby the piston is permitted to rock during its linear travel along the cylinder to allow for any misalignment between the cylinder wall and the piston rod.

According to this invention there is provided a fluid operated power actuator having a straight through piston rod wherein the piston is extended in the direction of the axis of the cylinder to form a bell-like structure and is mounted on the piston rod in a rockable manner at one extremity and contacts the cylinder surface at the other extremity.

Preferably according to this invention the piston is mounted on the piston rod by a portion parallel with the cylinder axis engaging a portion convex in a direction longitudinally of the cylinder axis, said piston being loosely engaged between abutments on the rod.

A multi-stroke power actuator or jack according to this invention having a straight through piston rod comprises a main piston extended in the direction of the axis of the cylinder to form a bell-like structure and mounted on the piston rod in a rockable manner at one extremity and contacting the cylinder surface at the other extremity, a sleeve slidable upon the piston rod, a secondary piston adapted to abut the main piston and extended in the direction of the axis of the cylinder to form a bell-like structure mounted on the sleeve in a rockable manner at one extremity and contacting the cylinder surface at the other extremity, stop means to limit the stroke of the secondary piston, passage means in the piston rod communicating with the cylinder between the two pistons, passage means communicating with the cylinder on the outer side of one piston, and passage means communicating with the cylinder on the outer side of the other piston.

The invention will now be more particularly described with reference to the accompanying drawings in which similar reference numerals indicate corresponding parts.

Fig. 1 is a longitudinal sectional view of a multi-stroke power actuator.

Fig. 2 is a fragmentary longitudinal sectional view of a modification.

Fig. 3 is a sectional detail, on a larger scale, of elements of the power actuator and with the curvature of certain elements slightly exaggerated for purposes of illustration.

In Fig. 1 the piston rod 1 extends straight through the cylinder 2 and at each end has a connection 3 formed with an aperture 4 for securing the rod to two members which are required to be simultaneously moved. A main piston 5 is formed with a crown 6 and a side wall 7 which extends in the direction of the axis of the cylinder to form a bell-like structure. The crown is formed with an aperture 8 the surface of which is of arcuate shape convex in a direction longitudinally of the cylinder axis and the piston base is formed with a flange 9 provided with rings 10, the periphery of said flange being of arcuate shape convex in a direction longitudinally of the cylinder axis. The crown engages a parallel portion 11 of the piston rod and said crown is retained on said portion between a shoulder 12 and a nut 13 in a manner which allows the piston to rock on the rod. A sealing ring 14 is housed within an annular groove in the aperture to contact the parallel portion of the piston rod.

A secondary piston 15 is formed with a crown 16 and a side wall 17 which extends in the direction of the axis of the cylinder to form a bell-like structure. The crown is formed with an aperture 18 the surface of which is of arcuate shape convex in a direction longitudinally of the cylinder axis and the piston base is formed with a flange 19 provided with rings 20. The periphery of said flange is of convex arcuate shape in a direction longitudinally of the cylinder axis as illustrated more particularly in Fig. 3. The crown 16 engages a parallel portion 21 of a sleeve 22 slidably mounted on the piston rod and said crown is retained on said portion between a shoulder 23 and a nut 24 in a manner which allows the secondary piston to rock on the sleeve. A sealing ring 25 is housed within an annular groove in the aperture 18 to contact the parallel portion of the sleeve.

The sleeve is slidably mounted in a bearing 26 provided in an end cap 27 of the cylinder so that the piston rod is supported indirectly by said bearing 26 and also said rod is supported directly by a bearing 28 formed at the other end of the cylinder. Suitable sealing and lubricating rings 29 are located between the piston rod and cylinder and piston rod and sleeve, and sealing and lubricating rings 30 are located between the sleeve and end cap.

A nozzle 31 is secured in the cylinder to admit fluid to and exhaust fluid from the one side of the piston 5 and a nozzle 32 is secured in the end cap 27 to admit fluid to and exhaust fluid from the opposite side of secondary piston 15. The piston rod is formed with passages 33 and 34 and a nozzle 35 is secured in said rod to admit fluid to and exhaust fluid from between the piston 5 and 15.

Considering the operation of the jack from the position shown in Fig. 1 of the drawings; admission of fluid to the cylinder through nozzle 32 traverses the secondary piston 15 which, abutting against the piston 5 at 36 also traverses said piston 5 and the piston rod 1 by the nut 13 to an extent limited by abutment of a nut 37 on the sleeve against a face 38 of the end cap 27. Admission of fluid to the cylinder between the pistons through nozzle 35 traverses the piston 5 and piston rod to the extent limited by the end of the cylinder. By admission of fluid to the cylinder through nozzle 31 and connection of nozzles 32 and 35 to exhaust means the two pistons are returned to a position in which the secondary piston 15 rests within the main piston 5 as shown in Fig. 1.

In the modification shown in Fig. 2 the main piston 5 has a crown 6 formed with a parallel aperture 39 and said crown engages the piston rod 1 at a portion 40 which is of arcuate shape convex in a direction longitudinally of the cylinder axis. The secondary piston 15 has a crown 16 formed with a parallel aperture 41 and said crown engages the sleeve 22 at a portion 42 which is of arcuate shape convex in a direction longitudinally of the cylinder axis.

Alternatively, instead of the piston being mounted in a rockable manner on the piston rod or sleeve by means of a convex portion which is of arcuate shape, said convex portion may be formed tapered i. e. with plane flanks.

Instead of the piston being retained between a nut and a shoulder it may be retained between two nuts or by means known as "Circlips."

It should be appreciated therefore that in a jack according to any of the constructions described the piston will rock on the piston rod to allow for any misalignment between the cylinder and the piston rod, and further it should be appreciated that the greater the distance between the piston crown and base the less will be the disturbing or tilting effect on the piston.

Having described my invention what I claim is:

1. A fluid operated power actuator comprising a cylinder, a piston rod extending axially therethrough, a piston in said cylinder having an opening through which the piston rod extends, the surface of said opening being in full contact with said piston rod, one of the contacting surfaces of said opening and rod being arcuate in longitudinal section, said piston extending longitudinally about said rod and thence outwardly to contact with the wall of the cylinder on a circumferential line of contact, the surface of said outwardly extending portion adjacent the cylinder wall diverging on opposite sides of said line of contact from the wall of said cylinder.

2. A fluid operated power actuator comprising a cylinder, a piston rod extending axially through said cylinder and having a pair of spaced abutments within said cylinder, a piston in said cylinder having a narrow portion between said abutments and contacting said piston rod on a circumferential line of contact and diverging therefrom on opposite sides of said line of contact, said piston extending longitudinally from contact with said piston rod about said piston rod and thence outwardly to contact with the wall of said cylinder on a circumferential line of contact and diverging from said cylinder wall on opposite sides of said line of contact.

3. The actuator of claim 2 in which the surface of said piston in contact with said piston rod between said abutments is arcuate in longitudinal section.

4. The actuator of claim 2 in which said piston rod has a surface between said abutments which is arcuate in longitudinal section.

5. The actuator of claim 1 in which said piston is provided with a sealing ring at the line of contact with said cylinder.

6. A fluid operated power actuator comprising a cylinder, a piston rod extending axially through said cylinder, a main piston in said cylinder engaging said piston rod with a rocking engagement and extending longitudinally about said rod and thence outwardly to contact with the wall of the cylinder on a circumferential line of contact and diverging from said cylinder wall on opposite sides of said line of contact, a sleeve slidable upon said piston rod, a secondary piston mounted to abut said main piston and having a rocking engagement with said sleeve and extending longitudinally about said sleeve and within said main piston and thence outwardly to contact with the wall of said cylinder on a circumferential line of contact and diverging from said cylinder wall on opposite sides of said line of contact, stopping means to limit the stroke of the secondary piston and sleeve, said rod having a passage communicating with the space between said pistons, said cylinder having communicating passages to its opposite ends on opposite sides of said pair of cylinders.

7. The actuator of claim 6 in which the surfaces of said pistons in contact with said cylinder walls are of arcuate curvature in longitudinal section.

8. The actuator of claim 6 in which said stop is mounted on said sleeve and in which said cylinder is recessed to receive said stop.

HENRY WILLIAM TREVASKIS.

REFERENCES CITED

The following references are of record in the file of this patent:

UNITED STATES PATENTS

| Number | Name | Date |
|---|---|---|
| 827,496 | Batisse | July 31, 1906 |
| 988,422 | Wilson | Apr. 4, 1911 |
| 1,491,797 | Harrison | Apr. 29, 1924 |
| 1,592,918 | Bragg | July 20, 1926 |
| 1,775,892 | Salardi | Sept. 16, 1930 |
| 2,198,129 | Sanford | Apr. 23, 1940 |
| 2,421,194 | Given | May 27, 1947 |
| 2,436,908 | Weenen | Mar. 2, 1948 |

FOREIGN PATENTS

| Number | Country | Date |
|---|---|---|
| 118,919 | Austria | Sept. 10, 1930 |
| 529,885 | Great Britain | Nov. 29, 1940 |
| 219,471 | Switzerland | May 16, 1942 |